UNITED STATES PATENT OFFICE.

JOHN S. ANDERS, OF NORTH WALES, PENNSYLVANIA.

IMPROVED MEDICINE.

Specification forming part of Letters Patent No. 55,449, dated June 12, 1866.

*To all whom it may concern:*

Be it known that I, JOHN S. ANDERS, of North Wales, in the county of Montgomery and State of Pennsylvania, have invented a new and Improved Cattle-Powder; and I do hereby declare that the following is a full, clear, and exact description thereof, which will enable others skilled in the art to make and use the same.

This invention relates to a mixture which is intended as an antidote against various diseases of horses and cattle in general, and which has proved to be a preservative against the cattle plague.

My compound is made of saltpeter, antimony, brimstone, ginger, cream of tartar, fenugreek, black brimstone, and alum, which are mixed together in about the following proportions: saltpeter, one-fourth pound; antimony, one-fourth pound; brimstone, one-fourth pound; ginger, one-half pound; cream of tartar, two ounces; fenugreek, one-fourth pound; black brimstone, one-fourth pound; alum, one-half pound.

Each ingredient is ground separately, and after all the ingredients have been mixed the mass is ground over so as to produce an even and uniform mixture.

It is administered to horses by giving one table-spoonful once a day when they are on their feet in ordinary cases. If the horses are off their feet, mix two table-spoonfuls in a pint of water and drench. In severe cases increase to three table-spoonfuls. To keep horses in health give one table-spoonful four times a week. For cows, to keep them in a healthy condition, use one table-spoonful four times a week. In ordinary cases of sickness use two table-spoonfuls twice a day, and in severe cases three table-spoonfuls. If they will not eat, mix with water and administer as a drench.

What I claim as new, and desire to secure by Letters Patent, is—

A cattle-powder made of the ingredients herein specified and mixed substantially as set forth.

The above specification of my invention signed by me this 26th day of January, 1866.

JOHN S. ANDERS.

Witnesses:
J. C. BOORSE,
A. S. BOORSE.